Oct. 28, 1930.  W. A. RICE  1,779,449
SUSPENDER ADJUSTING DEVICE
Original Filed Oct. 3, 1925  2 Sheets-Sheet 1
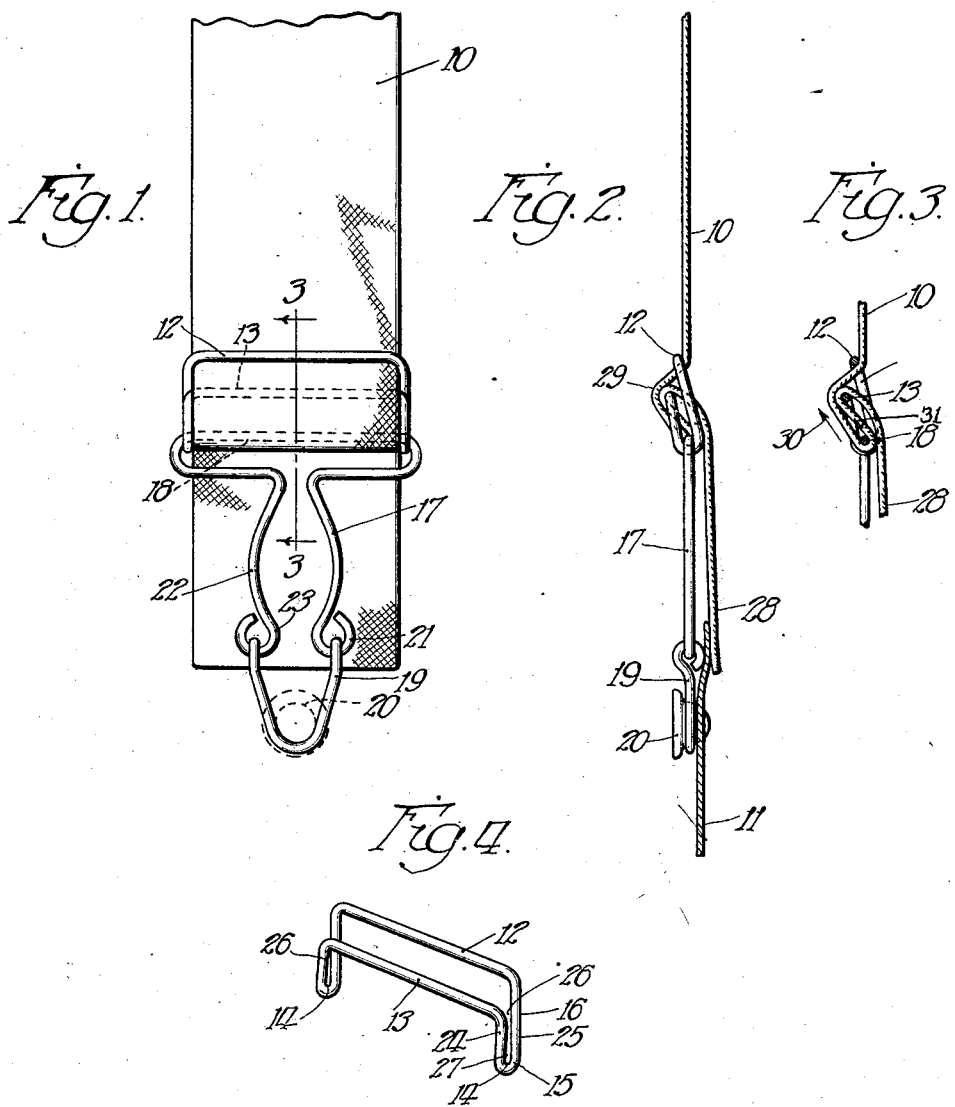
Inventor
William Adam Rice.

Oct. 28, 1930.  W. A. RICE  1,779,449
SUSPENDER ADJUSTING DEVICE
Original Filed Oct. 3, 1925   2 Sheets-Sheet 2
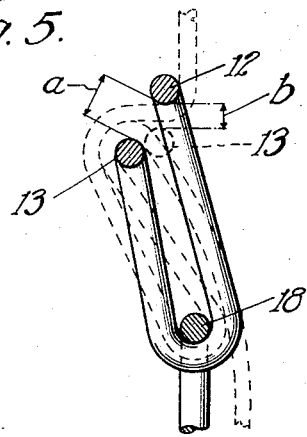
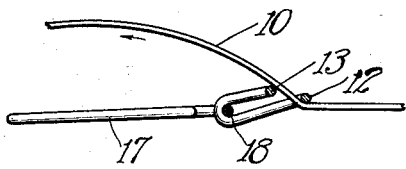
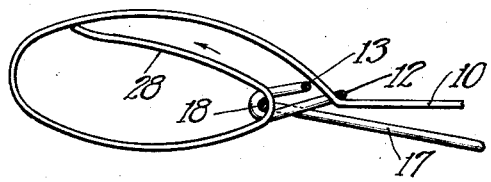
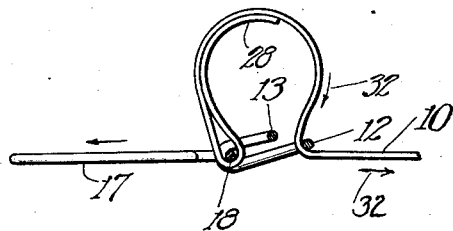
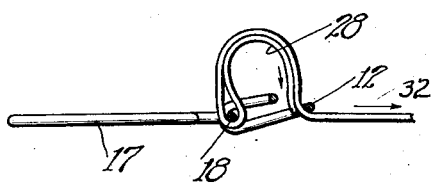
Inventor
William Adam Rice.
Emery, Booth, Janney & Varney Attys.

Patented Oct. 28, 1930

1,779,449

UNITED STATES PATENT OFFICE

WILLIAM ADAM RICE, OF DETROIT, MICHIGAN, ASSIGNOR TO UNIVERSAL BUTTON FASTENING AND BUTTON COMPANY, OF DETROIT, MICHIGAN, A CORPORATION OF MICHIGAN

SUSPENDER-ADJUSTING DEVICE

Application filed October 3, 1925, Serial No. 60,213. Renewed April 18, 1930.

This invention relates to devices for adjusting suspenders or the like and aims to provide a simple and improved device of this character which is efficient in its action and may be economically manufactured and easily and quickly applied. The nature of the invention may be readily understood by reference to one illustrative device embodying the invention and illustrated in the accompanying drawings.

In said drawings:

Fig. 1 is a plan view of the device applied to a suspender strap.

Fig. 2 is a side view of the construction shown in Fig. 1.

Fig. 3 is a transverse section taken along the line 3—3 of Fig. 1.

Fig. 4 is a perspective view of unassembled adjusting bars.

Fig. 5 is a transverse section of adjusting bars relatively arranged to secure additional gripping action.

Figs. 6, 7, 8 and 9 illustrate successive steps in one convenient method for applying the device to a suspender strap.

For convenient description the illustrative device is shown applied to an ordinary overall suspender strap 10 which is releasably connected to the usual overall bib 11.

The illustrative adjusting element comprises, in this instance, a pair of substantially parallel bars 13 and seats 14 for a third bar which, in this instance, are arranged to support such third bar in a substantial parallelism with bars 12 and 13. An adjusting element may advantageously be formed as illustrated in Fig. 4 of a rectangular frame preferably of spring wire (of appropriate cross section) the sides of which are bent upon themselves preferably at a point 15 other than the middle, thereby bringing the ends into spaced parallel relationship to provide the bars 12 and 13. The points of bending conveniently form the seats 14. The ends of the wire forming the rectangular frame may be joined by brazing, welding or otherwise, or they may be brought simply in abutting relationship. In either case, the wire is bent so that the abutting ends lie preferably somewhere along bar 13, in which position they are wholly concealed when the article is in use. In the device illustrated in Fig. 4 the ends have been joined to obliterate any joint.

In the present instance, the adjusting element 16 is arranged to receive, in seats 14, a fastening member for releasably connecting the suspender with the overall bib. Such a member is typified herein by the loop 17 having the usual transverse bar 18, which in this case rests in seats 14 and a button loop 19 to connect with a button 20, for example, on the overall bib 11. In this typical fastening member, the button loop 19 is hinged by eyes 21 to the body of the member, the sides of which are bowed outwardly to receive the head of the button but are brought together at their ends, as at 23, a distance somewhat less than the diameter of the collet of the button, thereby preventing the accidental disengagement of the button from the loop 19.

Obviously in the present instance, other forms of fastening members may be advantageously used in conjunction with the adjusting bars.

The sides 24 and 25 of the adjusting slide 16 are preferably separated adjacent their ends, as at 26, a distance somewhat less than the diameter of the bar 18, while at the same time separated adjacent their bases, as at 27, a distance slightly greater than the diameter of bar 18,—thereby permitting the bar 18 to pivot freely in such seats, but being prevented from accidental separation from the member 16 by the narrow spaces at 26. Such an arrangement permits convenient pre-assembly of the member 16 and loop 17 without the danger of separation before or during application to the suspender strap.

The bars and loop thus assembled provide three spaced bars, 12, 13 and 18 in substantial parallel relation whose axes, in this instance, have a triangular relationship, that is, the axes of the bars do not lie in a single plane (see, for example, Fig. 3). In employing these bars for holding a suspender strap 19 in adjusted position, the suspender strap may be threaded around the bars as illustrated, for example, in Figs. 2 and 3. In applying the adjusting device to the suspender strap in the manner illustrated in Figs. 2 and 3, the strap is passed behind bar 12 (that being between bar 12 and the wearer), over or outside bars 13 and 18, around bar 18, and again on the outside of the bar 13 between that bar and the outer strand of the strap. The end 28 is then permitted to hang down, if desired, as shown in Fig. 2. Thus both bar 13 and bar 18 are advantageously wholly concealed.

To adjust the effective length of the suspender strap it is simply necessary to loosen the strap around the bars 12, 13 and 18 and either take up or let out additional strap until the desired adjustment is secured,—whereupon the strap is pulled taut to remove all slack to restore the relationship illustrated in Fig. 2.

It is apparent that in the present adjusting device the bar 18 of the loop serves a dual function: In addition to its ordinary function of connecting the loop with the suspender strap, it serves as the third bar of the adjusting device,—thereby economizing in the use of wire or metal and contributing to give the entire garment a neater appearance.

With the illustrated arrangement of the strands of the suspender strap on the adjusting device the tendency to elongate the effective length of the suspender strap is resisted not only by the frictional engagement of the strap about the bars 12, 13 and 18 but by the relatively great frictional contact of the two engaging strands of the strap at the point 29. Under tension, the outer strand tends to travel in the direction of the arrow 30, whereas the inner strand tends to travel in the direction of the arrow 31,—whereby the frictional contact of these strands (which increases with the tension applied to the suspender) is utilized to prevent any change in the adjusted length of the strap.

In this connection, the bar 13, which is resiliently carried by the arms 24 (being of spring wire) exerts a yielding pressure upon the strands of the suspender strap, thereby tending to maintain the frictional contact by the overlying strands during momentary relaxations of the tension.

A further insurance against change in the adjusted length of the suspender strap is afforded in the loose connection between bars 13 and 18. The bar 18 may rise from its seats 14, thereby reducing its distance from bar 13 and increasing the degree of convolution of the suspender strap around the bars 13 and 18. This obviously serves to increase the area of frictional contact of the overlying strands of the strap, thereby increasing the resistance to relative slipping.

In Fig. 5 is illustrated an advantageous relation of the bars of the member for securing a positive grip upon the suspender strap, should such be desired in any particular case. In such a slide the bars 12 and 13 are so spaced that the distance "$a$" separating the bars in unstrained position is greater than the distance "$b$" separating the bars when relatively displaced under the stress of the suspender strap,—the relative position of the bars being illustrated by the dotted position of the bar 13. The distance "$b$" is designed to be slightly less than a double thickness of suspender strap, whereas the distance "$a$" is somewhat greater than double such thickness to permit ready application of the device and easy adjustment. Under stress, when the bar 13 is moved to its dotted line position with reference to bar 12, the two bars tend to grip with increasing pressure the two strands of suspender strap passing between them. Such an arrangement of the slide 16 is not, however, ordinarily necessary. In substantially all cases the usual frictional resistance is more than adequate without the aid of the gripping action illustrated in Fig. 5.

When the extremity 28 of the suspender strap is permitted to hang down as illustrated in Fig. 2, it prevents contact with the other clothing of the wearer of all metal parts of the bars and loop 17. Such parts are usually brass or brass plated and frequently disfigure the clothing if they come in contact with it. The same is true where the parts are made from some metals which will rust.

In the ordinary three bar suspender slide now on the market, in order to protect the clothing of the wearer from engagement with the central bar of the slide, it is necessary to loop the end of the suspender strap around the central bar so that it passes downwardly "outside" the bar instead of "inside" it as in the present case. In such cases, under tension, both strands of the strap tend to travel in the same direction around the central bar, hence the suspender strap very easily slips and alters the adjusted length of the suspender. As explained above, the tendency to slip is effectively prevented in the illustrative device while at the same time avoiding all contact with the clothing of the wearer.

In Figs. 6 to 9 is illustrated a rapid and simple method of applying the bars and suspender loop to a suspender strap. To effect such assembly, the workman passes the strap 10 between the bars 12 and 13 of assembled bars and loop. This step is illustrated in Fig. 6.

Then, as illustrated in Fig. 7, the loop 17 is bent backward upon the slide 16 and the extremity 28 of the strap is easily passed between the bars 13 and 18 in the direction indicated by the arrow.

Then, as illustrated in Fig. 8, the loop 17 is returned to normal position and tension is applied to the loop and to the suspender strap in opposite directions (as indicated by the arrows) to withdraw the slack in the direction of arrow 32. The frictional engagement of the outer strand of the strap with the extremity 28 causes the latter to travel along with the strap as the slack is taken out. This eventually carries the extremity 28 between the bars 12 and 13 as illustrated in Fig. 9, which completes the assembly of the device with the suspender strap. The tension in opposite directions is continued until the slack around the slide is removed and the parts assume the relation illustrated in Fig. 2.

The foregoing method affords a speedy and simple method of assembling the strap with the loop and slide and avoids the complicated method of assembly necessary for the type of three bar slide now on the market.

Obviously the invention is not limited to the details of the illustrative devices since those may be variously modified. Moreover it is not indispensable that all features of the invention be used conjointly since they may also be employed advantageously in various different combinations and sub-combinations.

Having described one embodiment of my invention, I claim:

1. In an adjustable suspender comprising in combination an adjusting device having a pair of spaced parallel bars and a seat for a third bar constructed and arranged to hold a third bar removably and in spaced and parallel relation to said pair of bars, a suspender strap threaded between said bars to hold it in adjusted position, and suspender fastening means connected with said removable third bar whereby said third bar functions both as an element in said adjusting device and as means to connect said fastening means with the suspender.

2. In an adjustable suspender comprising in combination an adjusting frame having a pair of spaced parallel bars connected together at their ends by U-shaped connecting members, said connecting members providing a seat for a third bar and arranged to hold a third bar in spaced parallel relation to said pair of bars, a third bar removably held in said seat and having suspender fastening means connected thereto, and a suspender strap threaded between said three bars and having its end doubled back and threaded over one of said bars whereby said adjusting frame holds said suspender in adjusted position.

3. In an adjustable suspender comprising in combination an adjusting device consisting of an integral wire frame bent upon itself to provide a pair of spaced parallel bars connected together by U-shaped side members constructed and arranged to hold a removable third bar in parallel and spaced relation to said pair of bars, a third bar removably held in said side members and having a suspender loop connected therewith, and a suspender strap threaded between said three bars and around said removable third bar, whereby said adjusting device holds said suspender in adjusted position and supports said suspender loop.

4. A method of assembling a three bar suspender adjusting device with a suspender strap which is characterized by passing the strap through one of the spaces between the three bars, forming a slack loop in said strap and passing the end of the strap through the other space between said bars and into the interior of the slack loop and into contact with the strap forming the loop, and then withdrawing the slack in the loop by pulling the strap in the direction from which it was first inserted in the adjusting device so that the frictional contact of the end of the strap with the loop will carry said end through the first mentioned space between the bars.

5. In an adjustable suspender, the combination comprising an adjusting device having a pair of parallel spaced bars, resilient connecting means in the form of U-shaped elements for yieldingly connecting said pair of bars together and providing a seat for a third bar, a third bar held in said seat in parallel and spaced relation to said pair of bars, said pair of bars being spaced apart a distance only great enough freely to pass two thicknesses of suspender strap, suspender fastening means connected with said third bar, said connecting means being constructed and arranged to yield under the tension of the suspender strap threaded between said bars and over the third bar so as to narrow the space between said bars and thereby increase the friction on said suspender strap, said connecting means holding said third bar in its seat against the tension applied thereto by said suspender strap.

6. In an adjustable suspender, the combination comprising an adjusting device having a pair of parallel spaced bars and a seat for a third bar constructed and arranged to hold a third bar removably and in spaced relation to said pair of bars, said pair of bars being spaced apart a distance only great enough freely to pass two thicknesses of suspender strap, suspender fastening means connected with said third bar, said third bar being operatively held in its seat by the suspender threaded between said pair of bars and around said third bar, said device serving to hold the suspender in adjusted position under the friction developed by tension applied through said suspender fastening means.

In testimony whereof, I have signed my name to this specification.

WILLIAM ADAM RICE.